United States Patent
Lu et al.

(10) Patent No.: US 9,284,985 B2
(45) Date of Patent: Mar. 15, 2016

(54) OIL SEAL BEARING AND FAN USING SAME

(71) Applicant: DELTA ELECTRONICS, INC., Taoyuan Hsien (TW)

(72) Inventors: Chao-Wen Lu, Taoyuan Hsien (TW); Chun-Chih Wang, Taoyuan Hsien (TW); Ding-Wei Chiu, Taoyuan Hsien (TW)

(73) Assignee: DELTA ELECTRONICS, INC., Taoyuan Hsien (TW)

( * ) Notice: Subject to any disclaimer, the term of this patent is extended or adjusted under 35 U.S.C. 154(b) by 0 days.

(21) Appl. No.: 14/455,066

(22) Filed: Aug. 8, 2014

(65) Prior Publication Data

US 2015/0323011 A1    Nov. 12, 2015

(30) Foreign Application Priority Data

May 12, 2014    (CN) .......................... 2014 1 0197702

(51) Int. Cl.
*F16C 32/06* (2006.01)
*F16C 33/74* (2006.01)
*F16C 33/10* (2006.01)

(52) U.S. Cl.
CPC ........... *F16C 33/745* (2013.01); *F16C 33/1025* (2013.01)

(58) Field of Classification Search
CPC .. F16C 17/026; F16C 17/102; F16C 32/0633; F16C 33/1025; F16C 33/103; F16C 33/745
USPC .......... 384/107, 111, 114, 118, 120, 130, 132
See application file for complete search history.

(56) References Cited

U.S. PATENT DOCUMENTS

| | | | |
|---|---|---|---|
| 2007/0274617 A1* | 11/2007 | Shibahara | F16C 17/107 384/107 |
| 2007/0286538 A1* | 12/2007 | Mizutani | F16C 33/107 384/112 |
| 2009/0285514 A1* | 11/2009 | Hori | F16C 17/107 384/107 |

\* cited by examiner

*Primary Examiner* — Phillip A Johnson
(74) *Attorney, Agent, or Firm* — Kirton McConkie; Evan R. Witt

(57) ABSTRACT

An oil seal bearing of a fan includes a ring-shaped body for supporting a shaft of the fan, and a protruded portion disposed on the ring-shaped body. The protruded portion has a first slope, wherein the first slope is disposed corresponding to an inner top surface of a hub of the fan. An oil storage space is formed between the first slope, the shaft and the inner top surface for storing a lubricant. A first angle is formed by the extension of the first slope and the inner top surface, such that the lubricant is retained by the capillarity between the first slope and the inner top surface. Under this circumstance, the oil sealing is achieved without any additional oil seal, the effective bearing height is maximized, and the advantages of enhancing the supporting efficiency and lengthening the lifetime of the product are also achieved.

20 Claims, 6 Drawing Sheets

OIL SEAL BEARING AND FAN USING SAME

FIELD OF THE INVENTION

The present invention relates to a bearing, and more particularly to an oil seal bearing and a fan using the same.

BACKGROUND OF THE INVENTION

In current fan industry, radial gaps formed between the oil seal and the shaft are utilized for avoiding the influence on the rotor and preventing the oil from being ditched while rotating as the main oil sealing method of a fan bearing.

The technology trends have been developed towards product miniaturization, so the height of the fan is also gradually reduced. The smaller the height of the fan, the larger the height ratio of the oil seal to a bearing such that the bearing's efficiency for supporting the rotor is significantly decreased and the lifetime of the bearing is also shortened. FIG. 1 is a sectional view of a conventional fan, a bearing and an oil seal. A hub 11 of the conventional fan 1 is assembled with a shaft 12. The shaft 12 is inserted into a sleeve 13. A bearing 14 is disposed in the sleeve 13 for supporting the shaft 12. To reduce the loss caused by friction, an oil is applied to the surface of the bearing 14 and between the shaft 12 and the bearing 14. In order to prevent the oil from being ditched while rotating, an oil seal 15 is disposed on the bearing 14 and between the shaft 12 and the sleeve 13. However, this kind of oil seals still have the drawbacks mentioned above. The thinner the fan 1, the larger the height ratio of the oil seal 15 such that the efficiency of the bearing is significantly decreased, and the lifetime of the bearing is also shortened.

SUMMARY OF THE INVENTION

The present invention provides an oil seal bearing and a fan using the same in order to overcome the above-mentioned drawbacks encountered by the prior arts.

The present invention provides an oil seal bearing and a fan using the same. The oil sealing is achieved without any additional oil seal in the present invention. Moreover, by disposing the ring-shaped body and the protruded portion, the bearing's height is maximized, and the advantages of enhancing the supporting efficiency and lengthening the lifetime of the product are achieved.

In accordance with an aspect of the present invention, there is provided an oil seal bearing of a fan. The oil seal bearing includes a ring-shaped body and a protruded portion. The ring-shaped body is utilized for supporting a shaft of the fan, and the protruded portion is disposed on the ring-shaped body. The protruded portion has a first slope, wherein the first slope is disposed corresponding to an inner top surface of a hub of the fan. An oil storage space is formed between the first slope, the shaft and the inner top surface for storing a lubricant. A first angle is formed by the extension of the first slope and the inner top surface such that the lubricant is retained by the capillarity between the first slope and the inner top surface.

In accordance with another aspect of the present invention, there is provided a fan. The fan includes a sleeve, a shaft, a hub and an oil seal bearing. The shaft is inserted into the sleeve. The hub is coupled with the shaft. The oil seal bearing includes a ring-shaped body and a protruded portion. The ring-shaped body is disposed in the sleeve for supporting the shaft, and the protruded portion is formed on the ring-shaped body. The protruded portion has a first slope, wherein the first slope is disposed corresponding to an inner top surface of the hub. An oil storage space is formed between the first slope, the shaft and the inner top surface for storing a lubricant. A first angle is formed by the extension of the first slope and the inner top surface, such that the lubricant is retained by the capillarity between the first slope and the inner top surface.

In accordance with another aspect of the present invention, there is provided a fan. The fan includes a sleeve, a shaft, a hub, an oil seal bearing and a positioning element. The shaft is inserted into the sleeve. The hub is coupled with the shaft. The oil seal bearing includes a ring-shaped body and a protruded portion, wherein the ring-shaped body is disposed in the sleeve for supporting the shaft and the protruded portion is formed on the ring-shaped body. The positioning element is disposed on a first surface of the ring-shaped body. A ring-shaped groove is formed between the protruded portion, the first surface and the positioning element for storing a lubricant.

The above contents of the present invention will become more readily apparent to those ordinarily skilled in the art after reviewing the following detailed description and accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1:
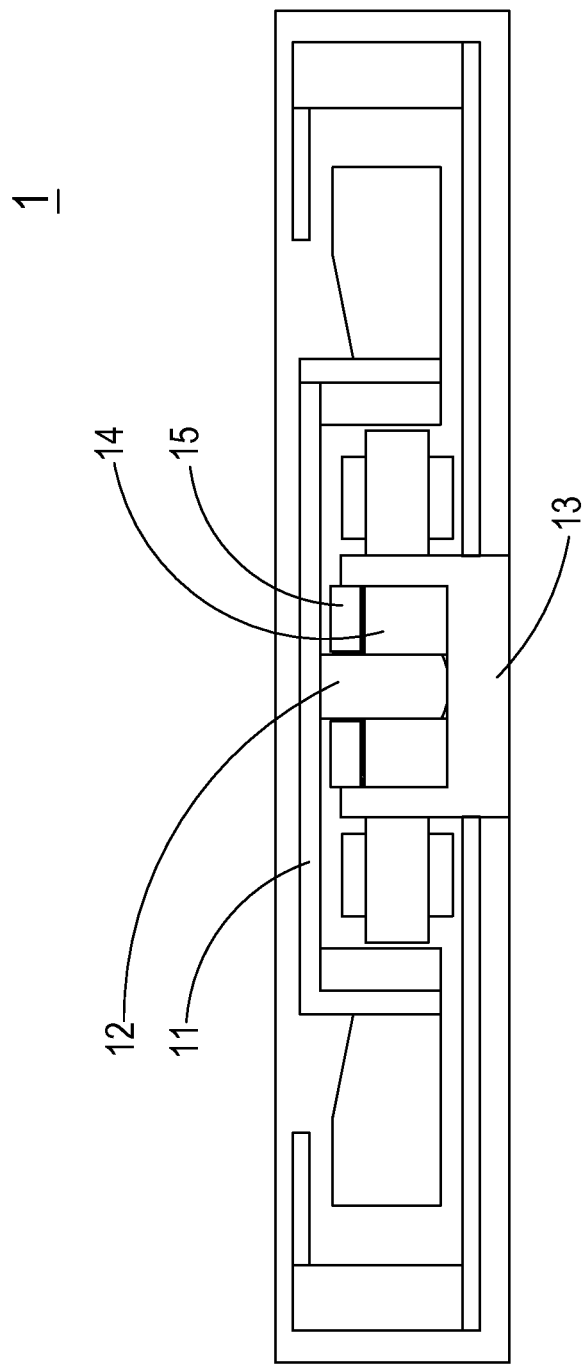
FIG. 1 is a sectional view of a conventional fan, a bearing and an oil seal.
Figure 2:
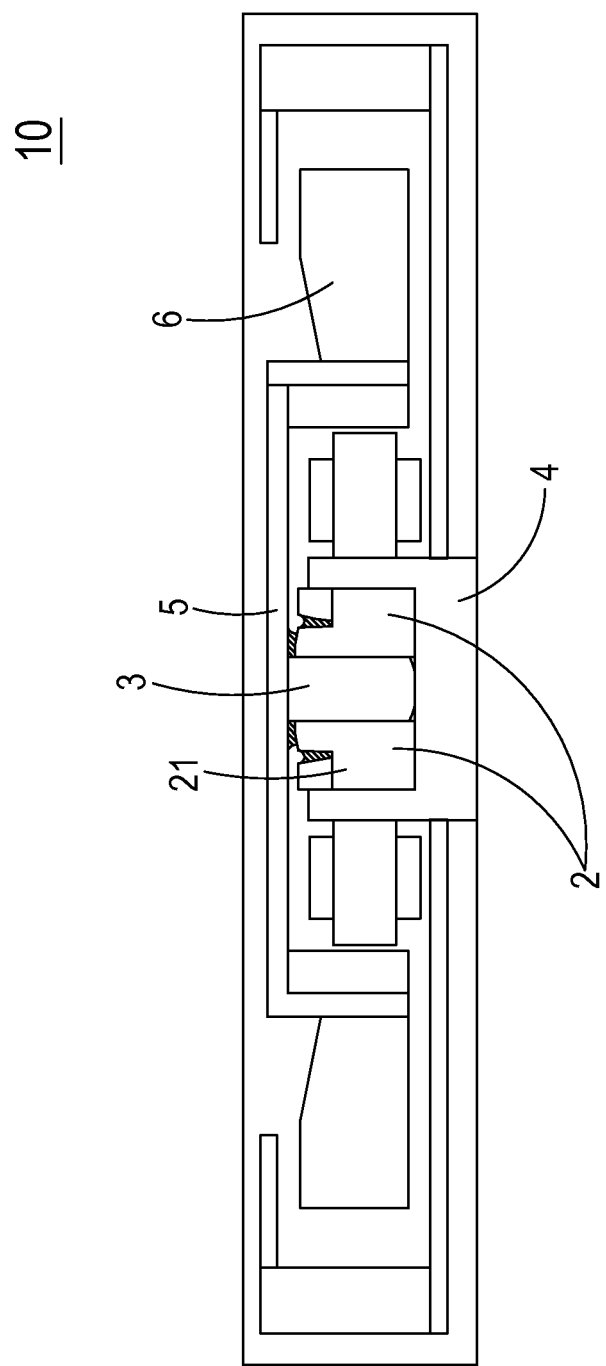
FIG. 2 is a sectional view of an oil seal bearing and a fan using the same according to an embodiment of the present invention.
Figure 3:
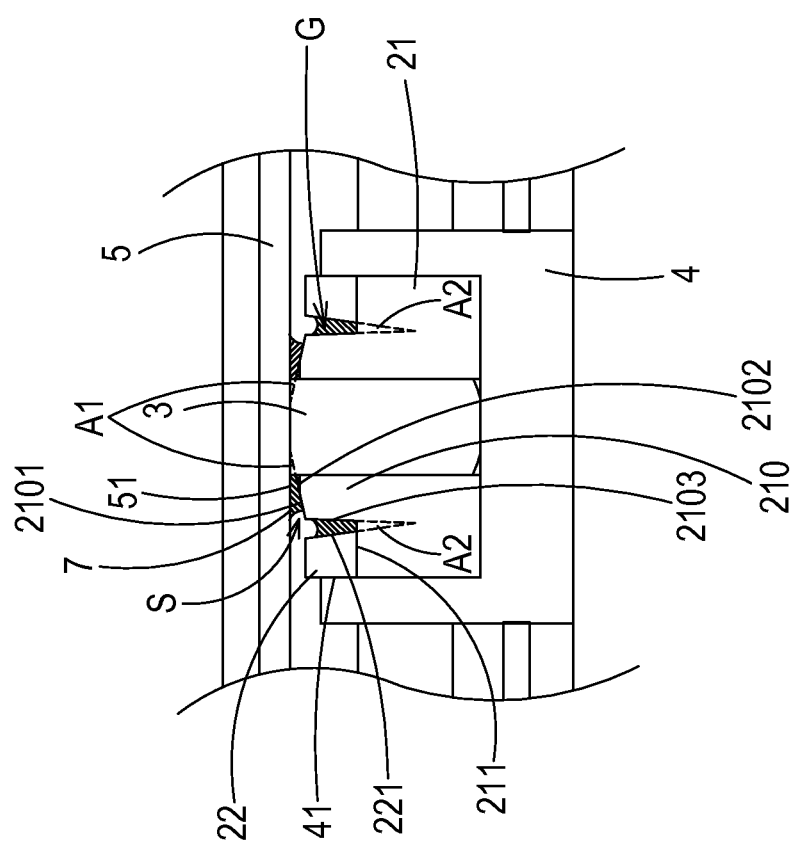
FIG. 3 is an enlarged view of the detailed structure of an oil seal bearing according to an embodiment of the present invention as shown in FIG. 2.

FIG. 2 is a sectional view of an oil seal bearing and a fan using the same according to an embodiment of the present invention. FIG. 3 is an enlarged view of the detailed structure of an oil seal bearing shown in FIG. 2. As shown in FIG. 2 and FIG. 3, an oil seal bearing 2 is applied to a fan 10 including a shaft 3 inserted into a sleeve 4 and coupled with a hub 5. The fan 10 includes an impeller 6 wherein driven by the motor for rotating, but not limited thereto. The oil seal bearing 2 includes a ring-shaped body 21. The ring-shaped body 21 is disposed around the shaft 3 and disposed in the sleeve 4. The oil seal bearing 2 further includes a protruded portion 210 formed on the ring-shaped body 21 and contacted with the shaft 3. The protruded portion 210 has a first slope 2101 disposed corresponding to an inner top surface 51 of the hub 5 of the fan 10. The first slope 2101 is formed of a straight slope, a curved slope or plural straight slopes, but not limited thereto.

In this embodiment, an oil storage space S is formed between the first slope 2101, the shaft 3 and the inner top surface 51 for storing a lubricant 7, and a first angle A1 is formed by the extension of the first slope 2101 and the inner top surface 51, such that the lubricant is retained between the first slope 2101 and the inner top surface 51 by the capillarity. In other words, the protruded portion 210 of the oil seal bearing 2 is specially designed so that a specified degree of the first angle A1 is formed by the first slope 2101 of the protruded portion 210 and the inner top surface 51 of the hub 5 for retaining the lubricant 7 by the capillarity and preventing the lubricant 7 from being ditched while rotating. That is, since the oil sealing is achieved by the oil seal bearing 2 itself, any additional oil seal can be omitted in the present invention. Moreover, by disposing the ring-shaped body 21 and the protruded portion 210, the bearing's height can be maximized so as to enhance the supporting efficiency and lengthen the lifetime of the product.

In some embodiments, when the kinetic viscosity of the lubricant 7 is greater than or equal to 40 cSt and is less than or equal to 200 cSt at 40° C., the first angle A1 between the extension of the first slope 2101 of the protruded portion 210 and the inner top surface 51, is greater than or equal to 5 degrees and is less than or equal to 22 degrees, but not limited thereto. Moreover, the protruded portion 210 further has a first horizontal plane 2102 connected with the first slope 2101 and formed between the first slope 2101 and the shaft 3. Via the first horizontal plane 2102, the first slope 2101 is prevented from directly contacting with the shaft 3. Therefore, the low strength due to the acute angle between the first slope 2101 and the shaft 3 and the abrasion due to the long-term rotation are avoided. Meanwhile, the first angle A1 formed by the extension of the first slope 2101 and the inner top surface 51 is still preferably greater than or equal to 5 degrees and less than or equal to 22 degrees.

Please refer to FIG. 3 again. The oil seal bearing 2 further includes a positioning element 22 disposed on a first surface 211 of the ring-shaped body 21 and contacted with an inner sidewall 41 of the sleeve 4 for auxiliarily positioning of the oil seal bearing 2. A ring-shaped groove G is defined between the protruded portion 210, the first surface 211 and the positioning element 22 for auxiliarily storing the lubricant 7. The protruded portion 210 further has a second slope 2103 and the positioning element 22 has a third slope 221, wherein the second slope 2103 is connected with the first slope 2101, the angle between the second slope 2103 and the first slope 2101 is preferably an obtuse angle, and the third slope 221 is disposed opposite to the second slope 2103. The positioning element 22 is a metal element. In order to improve the efficiency of oil sealing, a second angle A2 is formed by the extension of the second slope 2103 and the extension of the third slope 221, and the degree of the second angle A2 is preferably greater than or equal to 5 degrees and less than or equal to 22 degrees, but not limited thereto. In this embodiment, when the lubricant 7 is ditched by the centrifugal force caused by the rotation of the fan 10, the lubricant 7 is downwardly received by the ring-shaped groove G, which is downwardly shrunk and has a gap direction greater than 90 degrees. As a result, the lubricant 7 is effectively prevented from being ditched.

In brief, the lubricant 7 is mainly retained by the capillarity between the first slope 2101 of the protruded portion 210 and the inner top surface 51 of the hub 5. In addition, the ring-shaped groove G is formed between the second slope 2103 of the protruded portion 210, the first surface 211 of the ring-shaped body 21 and the third slope 221 of the positioning element 22 for auxiliarily storing the lubricant 7. Thus, the lubricant 7 is prevented from being ditched while rotating.

Figure 4A:
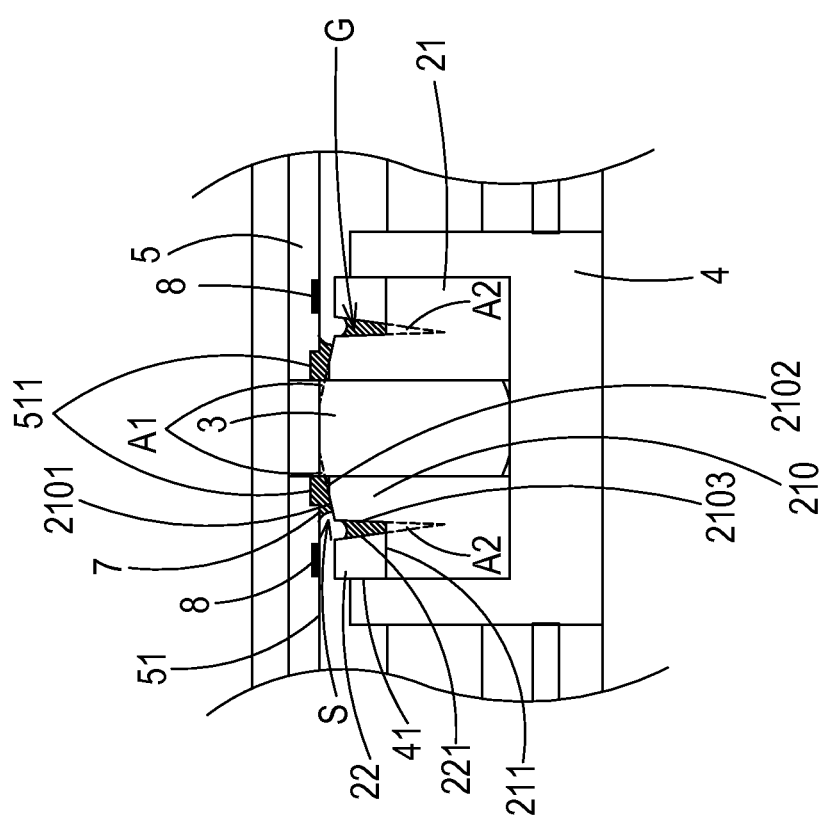
FIG. 4A is a sectional view of the detailed structure of an oil seal bearing according to another embodiment of the present invention.
Figure 4B:
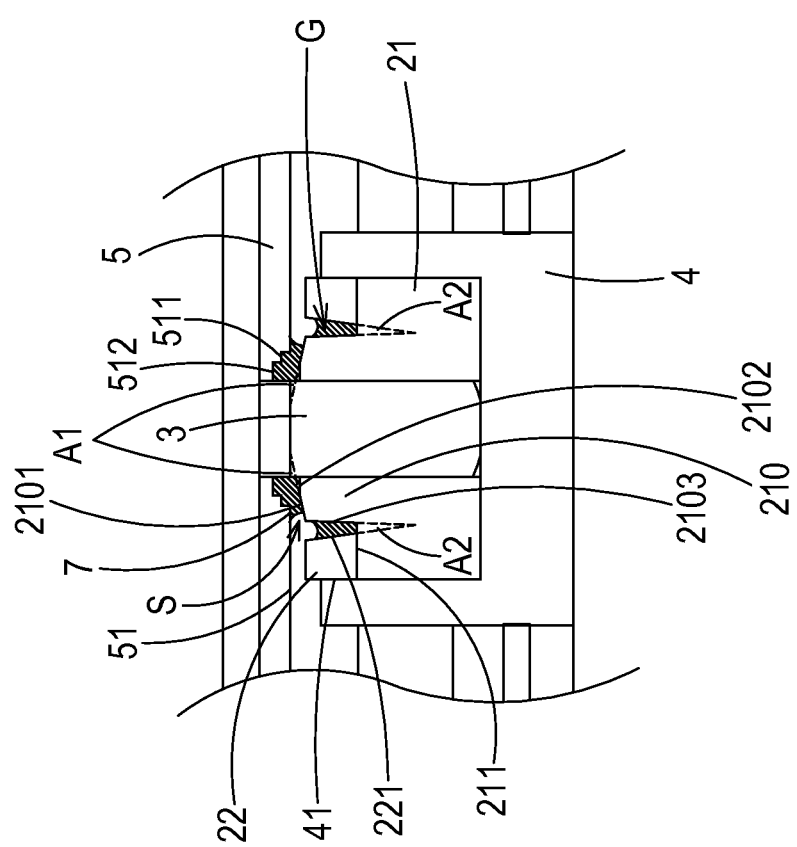
FIG. 4B is a sectional view of the detailed structure of an oil seal bearing according to still another embodiment of the present invention.

Additionally, the oil seal bearing 2 of the present invention is further coordinated with an oil repellent and/or the design of stepped surfaces of the inner top surface 51 of the hub 5 as a complete oil sealing system of the fan 10. Please refer to FIG. 4A and FIG. 4B. FIG. 4A is a sectional view of the detailed structure of an oil seal bearing according to another embodiment of the present invention. FIG. 4B is a sectional view of the detailed structure of an oil seal bearing according to still another embodiment of the present invention. In addition to the oil sealing method mentioned above, the oil sealing can be achieved by a first stepped surface 511 or a first stepped surface 511 and a second stepped surface 512, which is/are formed on the inner top surface 51 of the hub 5. That is, the inner top surface 51 of the hub 5 has a first stepped surface 511 formed on the inner top surface 51 and a second stepped surface 512 formed on the first stepped surface 511. There is a height difference between the first stepped surface 511 and the inner top face 51. Simultaneously, there is also a height difference between the second stepped surface 512 and the first stepped surface 511. The lubricant is considerably held through the first stepped surface 511 and the second stepped surface 512. On the other hand, when the rotational speed of the fan 10 is too fast or the amount of the lubricant 7 is too much, an oil repellent 8 is further coated on the inner top surface 51 of the hub 5 for preventing the lubricant 7 from being ditched. In the preferable embodiments, the oil repellent 8 is coated corresponding to the positioning element 22 or the top of the sleeve 4, but not limited herein.

Figure 4C:
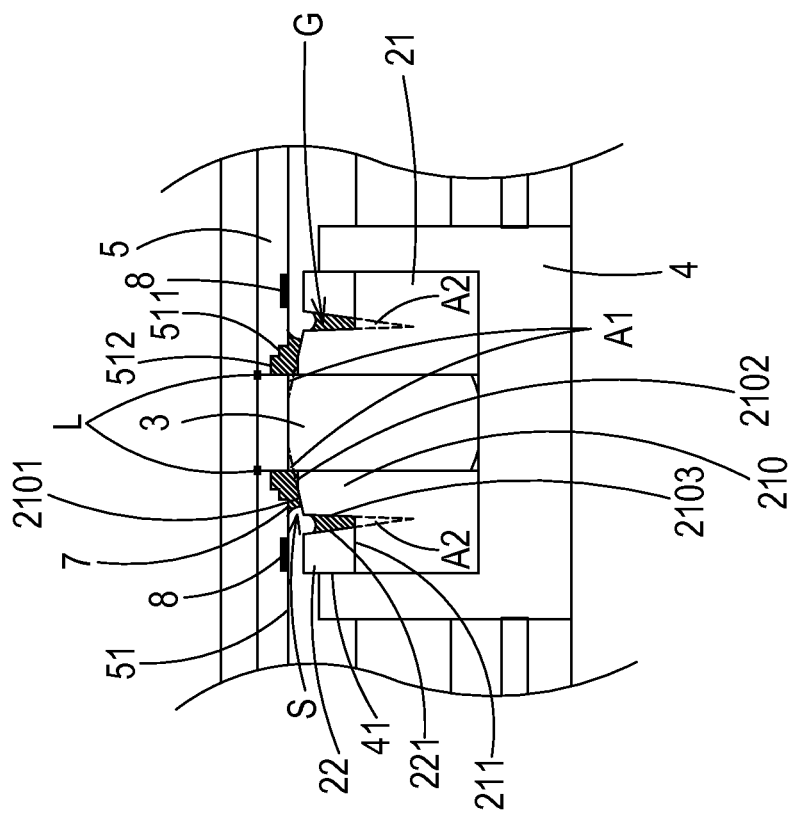
FIG. 4C is a sectional view of the detailed structure of an oil seal bearing according to still another embodiment of the present invention.

FIG. 4C is a sectional view of the detailed structure of an oil seal bearing according to still another embodiment of the present invention. Since the height of the shaft 3 is effectively utilized by the oil seal bearing 2 of the fan 10 of the present invention, the shaft 3 and the hub 5 are directly jointed through a laser welding. The joint L is illustrated as a point in FIG. 4C. However, the welding can be implemented through point welding or surface welding, but not limited herein. Under this circumstance, none of any installation height has to be reserved so that the trends and the demands of product miniaturization are met.

From the above descriptions, the present invention provides an oil seal bearing and a fan using the same. The oil sealing is achieved without any additional oil seal in the present invention. Moreover, by disposing the ring-shaped body and the protruded portion, the bearing height is maximized, and the advantages of enhancing the supporting efficiency and lengthening the lifetime of the product are achieved.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. An oil seal bearing of a fan, comprising
a body for supporting a shaft of the fan; and
a protruded portion disposed on the body and having a first slope, wherein the first slope is disposed corresponding to an inner top surface of a hub of the fan, wherein an oil storage space is formed between the first slope, the shaft and the inner top surface for storing a lubricant, and a first angle is formed by the extension of the first slope and the inner top surface, such that the lubricant is retained between the first slope and the inner top surface.

2. The oil seal bearing according to claim 1, wherein the protruded portion further has a first horizontal plane connected with the first slope and formed between the first slope and the shaft.

3. The oil seal bearing according to claim 1, wherein the first angle is greater than or equal to 5 degrees and is less than or equal to 22 degrees.

4. The oil seal bearing according to claim 1 further comprising a positioning element disposed on a first surface of the body and contacted with an inner sidewall of a sleeve, wherein the positioning element is a metal element.

5. The oil seal bearing according to claim 4, wherein a groove is formed between the protruded portion, the first surface and the positioning element for auxiliarily storing the lubricant.

6. The oil seal bearing according to claim 5, wherein the protruded portion further has a second slope and the positioning element has a third slope, wherein the second slope is connected with the first slope and the third slope is disposed opposite to the second slope.

7. The oil seal bearing according to claim 6, wherein a second angle is formed by the extension of the second slope and the extension of the third slope, and the second angle is greater than or equal to 5 degrees and is less than or equal to 22 degrees.

8. The oil seal bearing according to claim 6, wherein the angle between the second slope and the first slope is an obtuse angle.

9. The oil seal bearing according to claim 1, wherein the kinetic viscosity of the lubricant is greater than or equal to 40 cSt and is less than or equal to 200 cSt at 40° C.

10. The oil seal bearing according to claim 1, wherein the first slope is formed of a straight slope, a curved slope or plural straight slopes.

11. A fan comprising:
a sleeve;
a shaft inserted into the sleeve;
a hub coupled with the shaft; and
an oil seal bearing comprising:
a body disposed in the sleeve for supporting the shaft; and
a protruded portion disposed on the body and having a first slope, wherein the first slope is disposed corresponding to an inner top surface of the hub,
wherein an oil storage space is formed between the first slope, the shaft and the inner top surface for storing a lubricant, and a first angle is formed by the extension of the first slope and the inner top surface such that the lubricant is retained between the first slope and the inner top surface.

12. The fan according to claim 11, wherein the hub further has a first stepped surface formed on the inner top surface.

13. The fan according to claim 12, wherein the hub further has a second stepped surface formed on the first stepped surface.

14. The fan according to claim 11, further comprising an oil repellent coated on the inner top surface of the hub for preventing the lubricant from being ditched, and wherein the oil repellent is coated corresponding to a positioning element, which is disposed on a first surface of the body, or the top of the sleeve.

15. The fan according to claim 11, further comprising a positioning element disposed on a first surface of the body, wherein a groove is formed between the protruded portion, the first surface and the positioning element for storing a lubricant.

16. A fan, comprising:
a sleeve;
a shaft inserted into the sleeve;
a hub coupled with the shaft; and
an oil seal bearing comprising:
a body disposed in the sleeve for supporting the shaft; and
a protruded portion formed on the body; and
a positioning element disposed on a first surface of the body, wherein a groove is formed between the protruded portion, the first surface and the positioning element for storing a lubricant.

17. The fan according to claim 16, wherein the hub further has a first stepped surface formed on the inner top surface.

18. The fan according to claim 17, wherein the hub further has a second stepped surface formed on the first stepped surface.

19. The fan according to claim 16 further comprising an oil repellent coated on the inner top surface of the hub for preventing the lubricant from being ditched, and wherein the oil repellent is coated corresponding to the positioning element or the top of the sleeve.

20. The fan according to claim 16, wherein the shaft and the hub are jointed through a laser welding.

* * * * *